Jan. 6, 1925.

F. I. JADEN

COMBINATION TOOL

Filed Feb. 9, 1923

WITNESSES
H. J. Walker
G. D. Rollhave

INVENTOR
FRED I. JADEN
BY
ATTORNEYS

Jan. 6, 1925.
F. I. JADEN
1,522,369
COMBINATION TOOL
Filed Feb. 9, 1923
2 Sheets-Sheet 2
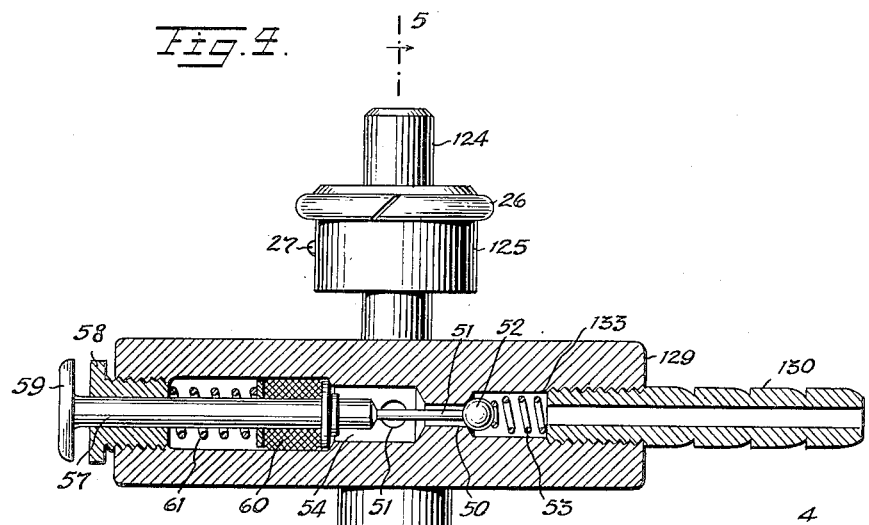
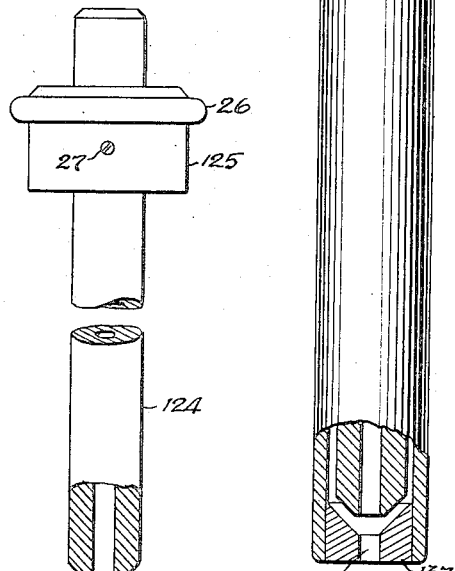
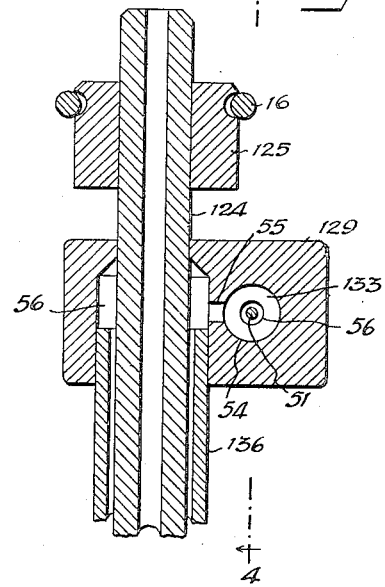
WITNESSES
H. J. Walker
INVENTOR
FRED I. JADEN
BY
ATTORNEYS Patented Jan. 6, 1925.

1,522,369

UNITED STATES PATENT OFFICE.

FRED I. JADEN, OF HASTINGS, NEBRASKA.

COMBINATION TOOL.

Application filed February 9, 1923. Serial No. 618,170.

*To all whom it may concern:*

Be it known that I, FRED I. JADEN, a citizen of the United States of America, and a resident of Hastings, in the county of Adams and State of Nebraska, have invented a new and Improved Combination Tool, of which the following is a description.

My invention relates to an assemblage constituting a combination tool and comprising an air chuck adapted to be connected with an air hose to receive air under pressure and liquid supply means coordinated therewith, as well as a combination nozzle adapted to discharge a mixture of the liquid and compressed air for cleaning purposes or to discharge air alone for cleaning purposes or for various other purposes such as tire inflation.

The general object of my invention is to provide an assemblage of the indicated character in which leakage of air from the air chuck is prevented while a connection of the chuck with the air nozzle or tubular stem may be readily effected in a manner to insure direct passage of the air from the chuck to the air nozzle or stem.

A further object is to provide means to variously manipulate the parts of the assemblage so that either a mixture of air and cleaning liquid such as kerosene may, with facility, be caused to be discharged from the nozzle or air alone discharged.

A more specific object of the invention is to provide for producing a simple form and arrangement of the parts and to promote convenience in assembling and disassembling the parts as well as facility of operation.

The nature of the invention and its distinguishing features and advantages will clearly appear as the description proceeds.

Reference is to be had to the accompanying drawings forming a part of this specification, it being understood that the drawings are merely illustrative of examples of the invention.

Figure 4 is a side elevation partly in section on the line 4—4, Figure 5, but showing a modification of the assemblage;

Figure 5 is a partial longitudinal section in a plane corresponding with the line 5—5 in Figure 4;

Figure 6 is a side elevation of the air nozzle or stem to coact with the air chuck, the liquid supply means being omitted.

Figure 1:
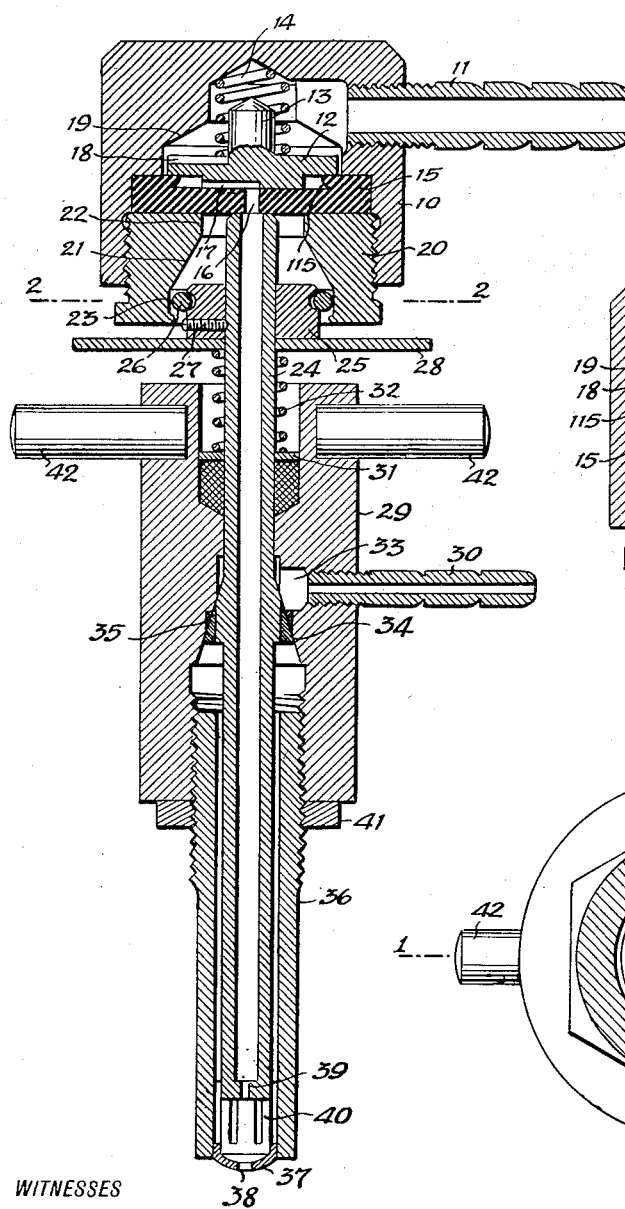
Figure 1 is a longitudinal section of a combination tool or assemblage embodying my invention.
Figure 3:
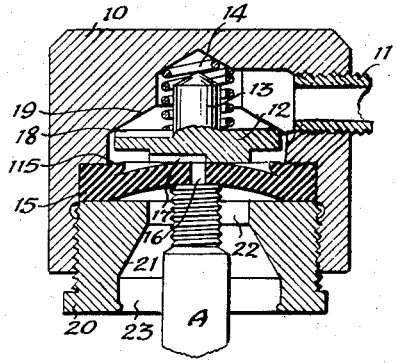
Figure 3 is a longitudinal section of the air chuck showing the use of the same for inducting air into a tire valve.
Figure 2:
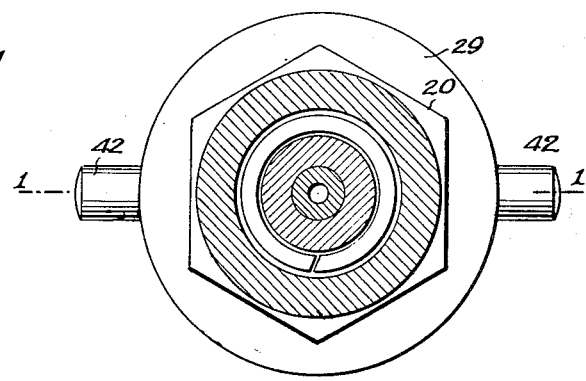
Figure 2 is a cross section as indicated by the line 2—2, Figure 1.

Referring at first more particularly to the assemblage as shown in Figures 1, 2 and 3, the air chuck 10 is of cap like form closed at its rear end and has a side inlet 11 adapted to connect with an air hose for receiving air under pressure. Within the chamber of the air chuck 10 is a metallic rigid valve element 12 generally of disk-like form subject to the air pressure from the inlet 11. Said element 12 has a stud 13 at the back thereof about which is coiled a spring 14 abutting at one end against said valve element 12 and abutting at its opposite end against the rear end of chuck 10. A coacting resilient disk-like valve element 15 is provided on which element 12 seats, said element 15 being clamped at its edge between a shoulder on the chuck 10 and a tubular screw plug 20 taken into the open forward side of said chuck. The resilient element 15 is thickened adjacent to the edges and at the inner side of the thickened portion, the material is undercut to provide an annular lip 115 which may contact with the edge portion of valve element 12. The forwardly extended central portion of the valve element 12 bears also against the resilient element 15.

Centrally in the resilient element 15 is an air passage 16 and in the rigid valve element 12 at the forward face is a lateral groove 17 leading to the center thereof to communicate with the air port 16. The back of the valve element 12 in the opening of said element contacts with and is arrested by a tapering stop wall 19 formed within the air chuck 10 and in the rear side of the element 12 is broached or milled a groove 18 so that air may pass about the edge of the valve notwithstanding the rearward movement of the valve against the wall 19. The screw plug 20 has a through-bore, the walls of which at the intermediate portion 21 taper whereas the rear end 22 of the bore is cylindrical as is also the zone 23 adjacent the forward end of the plug 20.

A tubular stem 24 constitutes an air nozzle and is adapted to be inserted in the air chuck through the bore of the plug 20 so that the rear end of said stem will contact with the resilient element 15 about the central air port 16 thereof to form an air-tight contact with said element 15. By providing a raised edge zone on the resilient element 15, said element more readily yields to the pressure of the edge portion of the valve 12, the yielding being more sensitive than if a broad contact surface extended over an area of element 15 equal to that of the total area of the valve 12 and the attribute of sensitive yielding in the element 15 is further developed by reason of the lip 115 which affords initially what is in effect a line contact with the valve 12. The whole insures an effective seating of the valve completely about its edge portion to guard against leakage. Also, the forming of the valve 12 in two series in different planes makes practical the provision of the passage 17. On the tubular stem 24 is a collar 25 held by a set screw 27, said collar having an external groove receiving a resilient split ring 26 which contacts with and forms a tight closure of the bore of the plug 20, whereby the tubular stem 24 is centered in the air chuck. On the valve stem 24 is an element projecting laterally and preferably in the form of a disk or washer 28 to form a finger-hold.

Forward of the disk 28 is fitted on the stem 24 a shell or casing 29 having a liquid inlet 30 for directing kerosene or other cleaning fluid to the interior of said casing 29. The rear end of the casing 29 has a stuffing box designated generally by the numeral 31 and a spring 13 is coiled around the stem 24, said spring abutting at its forward end against the stuffing box 31 and at its rear end against the disk 28, the arrangement permitting the casing 29 to be slid to a limited extent on the stem 24. The liquid inlet 30 is adapted to be connected with a hose from any convenient source of liquid supply (not shown) and leads to an internal chamber 33 in the casing 29 and at the forward end of said chamber 33 is a valve seat 34 preferably faced with leather or like yielding material, said seat being adapted to be engaged by a conical valve 35 which may also be formed of or faced with leather or the like. On the forward end of the casing 29 is a nozzle 36 closed by a cap 37 having a central jet orifice 38. Adjacent the forward end of the tubular stem or air nozzle 24 the bore is contracted as at 39 and in front of said contracted outlet 39 the tube 24 is slitted longitudinally as at 40.

With the described arrangement with the valve 35 unseated the cleansing liquid may flow from the chamber 33 past said valve, through the nozzle 36 at the outside of the air nozzle 24, then through slots 40 to the jet orifice 38 where it commingles with air under pressure escaping from the contracted outlet 39 of nozzle 24.

A lock nut 41 is provided on the threaded rear end of nozzle 36 and limits the forward movement of the liquid casing 29. On said casing 29 at the rear end are lateral projecting arms 42 or other laterally protuberant means for forming a finger-hold for pulling said casing 29 rearwardly against the pressure of the spring 32, whereby the valve seat 34 will be moved away from the valve 35, thereby permitting the liquid to flow past said valve to the nozzle 36, whereby to supply a mixed stream of both air under pressure and the cleansing liquid. In the rearward movement of the casing 29 by a user grasping the arms 42 the palm of the hand is held against the rear end of the air chuck 10. Thus, the device may readily be manipulated with one hand for the control of the liquid flow.

The spring 14 maintains the valve element 12 and resilient element 15 in position effecting a closure of the air stem or nozzle 24 so that no air can pass into said air nozzle. The rearward pull of the casing 29 through the medium of the arms 42 may be continued until the stem 24 is caused to exert sufficient pressure on the resilient element 15 to flex said element and to move the valve 12 rearwardly clear of the lip 115, whereby air under pressure from the inlet 11 will pass about the edge of the valve element 12 and through the passage 17 and port 16 to the stem or nozzle 24. If it be desired to exert sufficient rearward pressure on the stem or nozzle 24 for permitting the air to pass the valve 12 by a flexure of resilient element 15 and without unseating the valve 35, the disk 28 may be grasped by the fingers while the air chuck 10 is pressed against the palm of the same hand and by moving said disk and with it the stem 24 rearwardly, the valve 12 will be opened without permitting liquid to flow past the valve 35, whereby a stream of air alone for cleaning purposes, for example, will be directed through the jet orifice 38.

Instead of employing air under pressure for cleaning, said air may be inducted into a tire valve A as indicated in Figure 3.

The element 15 may be flexed and said valve opened only by pronounced rearward pressure of the tire valve A or the stem 24 against the forward side of said element 15, whereby no release of air from the tire can occur or other waste of air result.

By adjusting the lock nut 41 the amplitude of movement of the casing 29 is regulated and hence the flow of liquid determined. The opening of the valve 35 may thus be regulated so as to open to a given extent at all times.

The arrangement, it will be seen, permits of changing instantly from a mixture of cleansing liquid and air to a flow of air only, requiring no adjustments and no material amount of time to make the change. The arrangement furthermore provides that none of the liquid from the inlet 30 can reach the resilient element 15 which therefore can be made of rubber without danger of its deterioration. A slight movement by the fingers of one hand operates both valves leaving the other hand free. Furthermore, both valves are always normally closed whenever the pressure is relieved so that no time is taken up on the part of the operator to close the valves and at the same time the arrangement economizes the use of air and liquid. The tool may be merely dropped and the valves will take care of themselves for closing. Merely by relieving the pressure of the hand the flow is stopped instantly should the operator desire to change from cleaning one part of a structure to another.

In the device as illustrated by Figures 4 to 6, the rear stem or nozzle 124 corresponds essentially with the element 24 except that the valve 35 is omitted. Said stem 124 may, as shown, be uniformly cylindrical to be received concentrically within a liquid nozzle 136 having a closure at its forward end 137 formed with a jet orifice 138. At the rear end of the liquid nozzle 136 is transversely disposed a casing 129 into one end of which leads a liquid inlet 130 which discharges to a chamber 133 having a restricted outlet 50 through which passes a valve stem 51 having a valve 52 in the chamber 133, said valve being under the pressure of a coil spring 53 abutting at one end against the inlet nozzle 130 and at its other end against said valve 52. The discharge passage 50 leads to a chamber 54 in casing 129 from which chamber leads a lateral passage 55 to a chamber 56 at the rear end of the nozzle 136, whereby when valve 52 is opened, liquid will flow from inlet 130, past said valve 52, through passage 50, to chamber 54 and through the passage 55 to chamber 56 and to the nozzle 136 and out through the jet orifice 138. The stem 51 is operated by a plunger rod 57 extending through a gland 58 or the like in the end of the casing 129 opposite the inlet 130, said plunger 57 having a head 59 outside of the casing 129 against which pressure may be exerted for moving said plunger and the valve stem 51 for opening valve 52 against the pressure of the spring 53. A stuffing box 60 is provided within the chamber 54 about the plunger 57, said stuffing box being acted upon by a spring 64 coiled about said plunger, the arrangement serving to prevent escape of oil from chamber 50 past the stuffing box 60.

The air stem or nozzle 124 is equipped with a collar 125 corresponding with the collar 25 and having a resilient split ring 26 in close engagement with the bore of a screw plug 20 of air chuck 10. The operation of the device is substantially the same as previously described, the opening or closing of the valve 52 serving to control the flow of cleaning liquid from inlet 130 to nozzle 136 and whereby a commingled stream of liquid and air may be caused to discharge from the jet orifice 138 or air alone discharged when said valve 52 is closed. For uses where a stream of air only is desired, the stem 124 with its collar 125 and ring 126 as shown in Figure 6 may alone be employed in association with the air chuck 10.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. As a new article of manufacture, an air chuck having an air inlet, a rigid valve in said chuck subject to pressure of air from said inlet, a resilient element in front of said rigid valve and against which said rigid valve bears at its center, said resilient element having a thickened edge portion against which said rigid valve bears in a plane rearward of the central bearing of said rigid valve against said resilient element, said valve having a transverse passage in its front face and said resilient element having a passage communicating with said valve passage.

2. As a new article of manufacture, an air chuck having an air inlet, a rigid valve in said chuck subject to pressure of air from said inlet, a resilient element in front of said rigid valve and against which said rigid valve bears at its center, said resilient element having a thickened edge portion against which said rigid valve bears in a plane rearward of the central bearing of said rigid valve against said resilient element, said valve having a transverse passage in its front face and said resilient element having a passage communicating with said valve passage; said rigid valve furthermore having a groove in its rear face and said chuck having a surface adapted to constitute a stop to limit the opening movement of said rigid valve.

FRED I. JADEN.